(12) United States Patent
Bakli et al.

(10) Patent No.: US 11,485,639 B2
(45) Date of Patent: Nov. 1, 2022

(54) CATALYST SUPPORT SYSTEMS FOR AMMONIA OXIDATION BURNERS

(71) Applicant: YARA INTERNATIONAL ASA, Oslo (NO)

(72) Inventors: Kjetil Bakli, Skien (NO); Kevin Dring, Stathelle (NO); Øystein Nirisen, Brevik (NO); Marcel Delhaye, Lasne (BE); André De Smet, Terneuzen (NL)

(73) Assignee: YARA INTERNATIONAL ASA, Oslo (NO)

( * ) Notice: Subject to any disclaimer, the term of this patent is extended or adjusted under 35 U.S.C. 154(b) by 315 days.

(21) Appl. No.: 16/956,181

(22) PCT Filed: Dec. 19, 2018

(86) PCT No.: PCT/EP2018/085755
§ 371 (c)(1),
(2) Date: Jun. 19, 2020

(87) PCT Pub. No.: WO2019/121862
PCT Pub. Date: Jun. 27, 2019

(65) Prior Publication Data
US 2020/0338518 A1     Oct. 29, 2020

(30) Foreign Application Priority Data

Dec. 19, 2017   (EP) ..................... 17208502

(51) Int. Cl.
*B01J 8/02*      (2006.01)
*B01J 12/00*     (2006.01)
(Continued)

(52) U.S. Cl.
CPC ............. *C01B 21/28* (2013.01); *B01J 8/02* (2013.01); *B01J 8/0292* (2013.01); *B01J 12/007* (2013.01);
(Continued)

(58) Field of Classification Search
CPC ............................ C01B 21/267; C01B 21/28
See application file for complete search history.

(56) References Cited

U.S. PATENT DOCUMENTS 3,195,988 A * 7/1965 Roberts .................. B01J 8/0278
                                                     422/219
3,954,417 A    5/1976 Jalbing
(Continued)

FOREIGN PATENT DOCUMENTS

CA      2108521       4/1994
CO      6460738 A2    6/2012
(Continued)

OTHER PUBLICATIONS

International Search Report and Written Opinion, Application No. PCT/EP2018/085755, dated Mar. 20, 2019, 13 pages.
(Continued)

*Primary Examiner* — Jennifer A Leung
(74) *Attorney, Agent, or Firm* — Dilworth IP, LLC

(57) ABSTRACT

Catalyst support systems for ammonia oxidation burners comprising a top flange and an inner wall. The top flange comprises a planar section, a rounded outer edge, and a rounded inner edge, the rounded outer edge and the rounded inner edge being separated by the planar section. The inner wall comprises a carrier plate, a gauze shelf, and a bottom plate shelf, the gauze shelf and the bottom plate shelf being attached to the carrier plate. The carrier plate is attached to the top flange by means of the rounded inner edge.

23 Claims, 10 Drawing Sheets

(51) Int. Cl.
*C01B 21/28* (2006.01)
*C01B 21/26* (2006.01)
*B01J 10/00* (2006.01)
*B01J 19/24* (2006.01)
*C01B 21/20* (2006.01)

(52) U.S. Cl.
CPC .......... *C01B 21/267* (2013.01); *B01J 10/007* (2013.01); *B01J 19/24* (2013.01); *B01J 2208/00884* (2013.01); *C01B 21/20* (2013.01)

(56) References Cited

U.S. PATENT DOCUMENTS

| | | | |
|---|---|---|---|
| 4,668,494 A | * | 5/1987 | Van Hook .............. B01J 19/127 252/376 |
| 5,985,220 A | | 11/1999 | Hughes |
| 6,673,466 B2 | | 1/2004 | Rolf |
| 6,878,351 B1 | | 4/2005 | Davies |
| 7,241,427 B2 | | 7/2007 | Nagel |
| 2004/0234433 A1 | | 11/2004 | Axon |
| 2006/0160698 A1 | | 7/2006 | Muter |
| 2011/0200515 A1 | | 8/2011 | Roe |
| 2016/0200575 A1 | | 7/2016 | Olbert et al. |

FOREIGN PATENT DOCUMENTS

| | | | | |
|---|---|---|---|---|
| DE | 2438092 | | 9/1975 | |
| DE | 2754643 C2 | * | 1/1989 | |
| DE | 8914489 | | 3/1990 | |
| EP | 0595132 | | 5/1994 | |
| WO | 1991008982 | | 6/1991 | |
| WO | 2004005187 A1 | | 1/2004 | |
| WO | WO-2008105669 A1 | * | 9/2008 | ............ B01J 8/009 |
| WO | 2013034304 A1 | | 3/2013 | |
| WO | WO-2016028698 A1 | * | 2/2016 | ............ B01J 8/025 |
| WO | WO-2017089231 A1 | * | 6/2017 | ............ B01J 10/007 |

OTHER PUBLICATIONS

Colombian Office Action (with English translation) issued in App. No. CONC20200008858, dated May 31, 2022, 21 pages.

* cited by examiner

CATALYST SUPPORT SYSTEMS FOR AMMONIA OXIDATION BURNERS

TECHNICAL FIELD

The present invention is in the field of catalysts support systems for ammonia oxidation burners.

BACKGROUND

Minimizing thermal stresses is an important aim in the design of catalyst support structures in ammonia burners, colloquially named ammonia burner baskets. This is challenging because of the high temperatures involved in the ammonia burning process. Indeed, large temperature differences that may even be greater than 500° C. between relatively hot catalyst support structures and relatively cold reactor walls result in differences in thermal expansion, which may be more significant during transient conditions. These differences need to be accommodated in order to prevent the occurrence of unacceptably large thermal stresses. Initially, the large thermal stresses may result in the burner being unable to fulfil its main function and thereby leading to ammonia bypass and a further increase in temperature or change in the temperature distribution within the burner. This can lead to the formation of cracks and basket failure where the burner wall integrity becomes compromised. As a consequence, the different water and steam circuit exchange also risks failure. Repeated thermal cycling due to starting and stopping of the production process increases the risk of basket failure well before the expected design life of the burner basket is reached.

As a result of excessive thermal stress, existing catalyst support structures tend to fail by cracking between the vertical shell from the main flange and the basket assembly, and in the weld between the catalyst shelf and the basket shell. Examples of such existing catalyst support structures include Grand Paroisse (GP) and Uhde type (see e.g. R. Buchenau, The catalyst basket—How to prolong the service life, paper presented at the $3^{rd}$ UHDE Nitric Acid Symposium, Dortmund, 26-28 May 1986) catalyst support structures.

One attempt at overcoming these issues is described in WO2013034304. However, this particular type of burner basket comprises many different parts, e.g. guide pins that all need to be welded, thereby making the burner basket difficult to assembly, and further causing many welded connections which form weak links in the design. Such weak links are prone to ruptures and other mechanical failures. A crack or a rupture in the rim allows ammonia to leak through, thereby reducing the amount of ammonia passing through the catalyst bed, which results in a less efficient process. Ammonia leakage can also lead to high local temperatures that can cause damage to burner components. Further, unreacted ammonia may form ammonium nitrates which can pose an explosion risk.

Accordingly, there remains a need for catalyst support systems for ammonia oxidation burners which are less susceptible to thermal stress-induced failure. In addition, there is a need for stable catalyst support systems. Also, there is a need for catalyst support systems which allow a gaslight separation between the space above and below the ammonia combustion catalyst. Also, the catalyst support system preferably contributes to a uniform downstream gas flow.

SUMMARY

It is an object of the present invention to provide devices and methods for catalytic oxidation of ammonia which meet one or more of the above needs.

The present disclosure relates to a rim (100) for a catalyst support system for ammonia oxidation burners comprising a top flange (110) and an inner wall (120),
- the top flange (110) comprising a planar section (111), a rounded outer edge (112), and a rounded inner edge (113), the rounded outer edge (112) and the rounded inner edge (113) being separated by the planar section (111);
- the inner wall (120) comprising a carrier plate (121), a gauze shelf (122), and a bottom plate shelf (123), the gauze shelf (122) and the bottom plate shelf (123) being attached to the carrier plate (121); and,
- the carrier plate (121) being attached to the top flange (110) by means of the rounded inner edge (113).

In particular embodiments, the rim (100) as disclosed herein provides that the carrier plate (121) has a thickness which is constant within a margin of error of 10%, preferably within a margin of error of 5%, more preferably within a margin of error of 1%.

In particular embodiments, the rim (100) as disclosed herein provides that the carrier plate (121) is planar.

In particular embodiments, the rim (100) as disclosed herein provides that the ratio of the width of the planar section (111) and the radius of curvature of the rounded outer edge (112) is between 0.50 to 10.0.

In particular embodiments, the rim (100) as disclosed herein provides that the radius of curvature of the rounded outer edge (112) equals the radius of curvature of the rounded inner edge (113) within a margin of error of 10.0%, preferably 5.0%, more preferably 2.0%, most preferably 1.0%.

In particular embodiments, the rim (100) as disclosed herein provides that the planar section (111) has a width of 2.0 cm to 20.0 cm, preferably a width of 2.0 cm to 10.0 cm.

In particular embodiments, the rim (100) as disclosed herein provides that the rounded outer edge (112) and/or the rounded inner edge (113) have a radius of curvature of at least 20 mm to at most 100 mm, preferably of 25 mm to at most 50 mm.

In particular embodiments, the rim (100) as disclosed herein provides that the gauze shelf (122) and/or the bottom plate shelf (123) comprise a plurality of expansion slits (1221, 1231); the expansion slits (1221, 1231) preferably ending in a hole (1222, 1232), more preferably a circular hole (1222, 1232), most preferably a circular hole (1222, 1232) having a diameter of 1 mm to 5 mm.

In particular embodiments, the rim (100) as disclosed herein further comprises a wave breaker ring (124) attached to the carrier plate (121) between the bottom plate shelf (123) and the gauze shelf (122); preferably wherein the distance between the bottom plate shelf (123) and the wave breaker ring (124) is between 130 mm and 150 mm.

According to another embodiment, the present disclosure relates to a catalyst support system for ammonia oxidation burners comprising a rim (100) as disclosed herein, and a body comprising one or more catalyst gauzes, and a bottom plate.

According to another embodiment, the present disclosure relates to an ammonia burner comprising a reactor vessel and a catalyst support system as disclosed herein, the reactor vessel comprising a reactor wall (300), the catalyst support system being attached to the reactor wall (300), the catalyst support system is preferably attached to the reactor wall by means of one or more welds.

In particular embodiments, the ammonia burner as disclosed herein further provides that a heat shield (320) is provided between the catalyst support system and the reactor wall (300); preferably wherein one or more wall coils (310) are attached to the reactor wall (300), the heat shield (320) being provided between the one or more wall coils (310) and the catalyst support system.

In particular embodiments, the ammonia burner as disclosed herein further comprises one or more counter weights (130) for holding down the one or more catalyst gauzes, one or more heat shields (131) preferably being provided on top of the one or more counterweights (130).

According to another embodiment, the present disclosure relates to the use of a rim (100) as disclosed herein, of a catalyst support system as disclosed herein, and/or of an ammonia burner as disclosed herein for the catalytic oxidation of ammonia.

According to another embodiment, the present disclosure relates to a method for oxidizing ammonia comprising the steps
providing an ammonia burner as disclosed herein;
directing an air-ammonia mixture over the one or more catalyst gauzes; and,
catalytically oxidizing the ammonia.

DESCRIPTION OF THE FIGURES

The following description of the figures of specific embodiments of the invention is only given by way of example and is not intended to limit the present explanation, its application or use. In the drawings, identical reference numerals refer to the same or similar parts and features.

Figure 1:
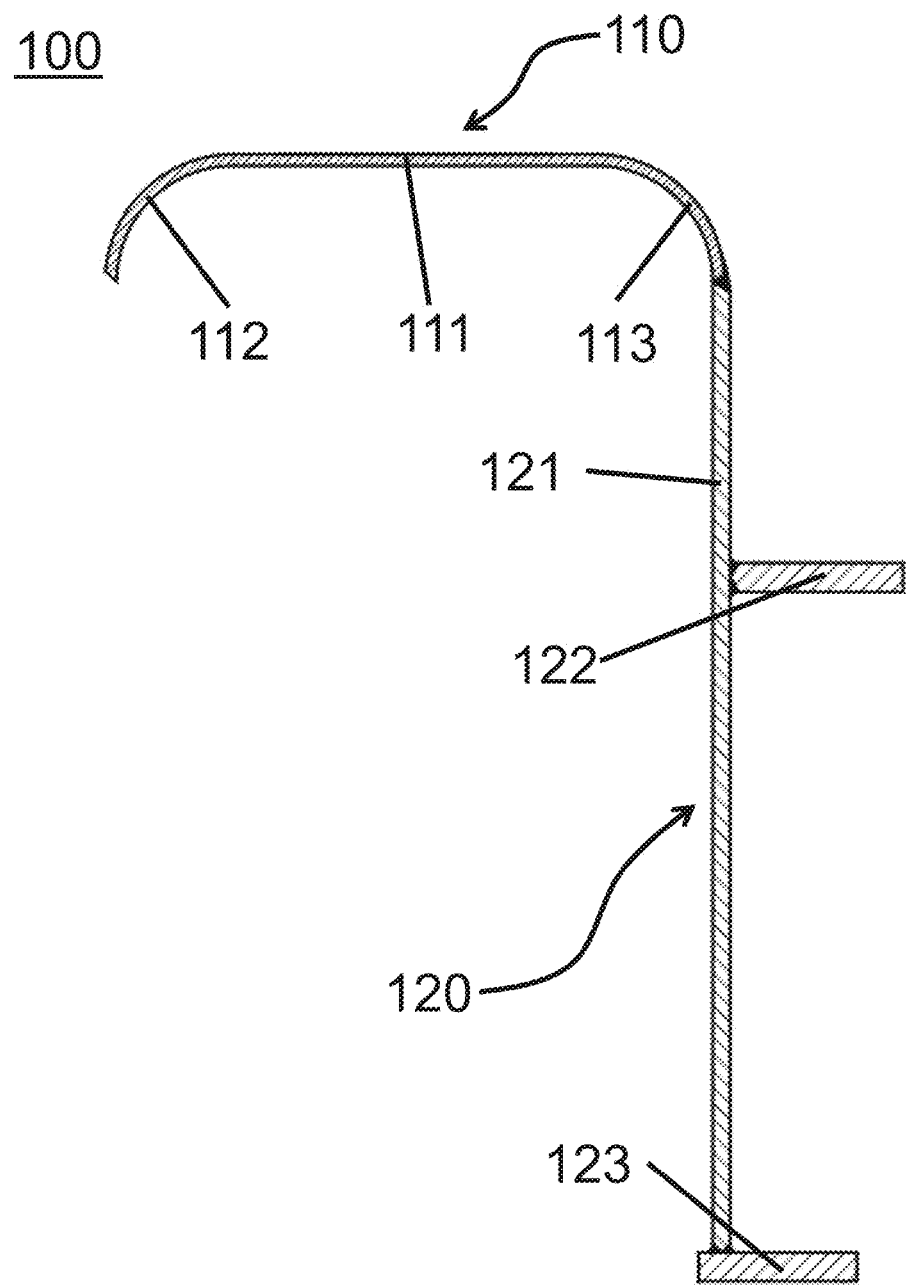
FIG. 1 shows a radial cross section through a rim (100).

The following reference numerals are used in the description and figures:
100—rim; 110—top flange; 111—planar section; 112—rounded outer edge; 113—rounded inner edge; 120—inner wall; 121—carrier plate; 122—gauze shelf; 1221—expansion slits in gauze shelf; 1222—holes at end of expansion slits in gauze shelf; 123—bottom plate shelf; 1231—expansion slits in bottom plate shelf; 1232—holes at end of expansion slits in bottom plate shelf; 124—wave breaker ring; 150—outer wall; 130—counter weight; 131—heat shield on counter weight; 132—handle of counter weight; 133—assembly rod of counter weight; 1331—blunted corners of assembly rod; 134—assembly sheath of counter weight; 1341—blunted corners of assembly sheath; 140—rim support; 200—body; 210—honeycomb structure; 300—reactor wall; 310—reactor wall coils; 320—heat shield between rim (100) and reactor wall coils (310); 330—upper rim attachment to reactor wall; 331—lower rim attachment to reactor wall.

DESCRIPTION OF THE INVENTION

As used below in this text, the singular forms "a", "an", "the" include both the singular and the plural, unless the context clearly indicates otherwise.

The terms "comprise", "comprises" as used below are synonymous with "including", "include" or "contain", "contains" and are inclusive or open and do not exclude additional unmentioned parts, elements or method steps. Where this description refers to a product or process which "comprises" specific features, parts or steps, this refers to the possibility that other features, parts or steps may also be present, but may also refer to embodiments which only contain the listed features, parts or steps.

The enumeration of numeric values by means of ranges of figures comprises all values and fractions in these ranges, as well as the cited end points.

The term "approximately" as used when referring to a measurable value, such as a parameter, an amount, a time period, and the like, is intended to include variations of +/−10% or less, preferably +/−5% or less, more preferably +/−1% or less, and still more preferably +/−0.1% or less, of and from the specified value, in so far as the variations apply to the invention disclosed herein. It should be understood that the value to which the term "approximately" refers per se has also been disclosed.

All references cited in this description are hereby deemed to be incorporated in their entirety by way of reference.

Unless defined otherwise, all terms disclosed in the invention, including technical and scientific terms, have the meaning which a person skilled in the art usually gives them. For further guidance, definitions are included to further explain terms which are used in the description of the invention.

In the following passages, different aspects or embodiments of the invention are defined in more detail. Each aspect or embodiment so defined may be combined with any other aspect(s) or embodiment(s) unless clearly indicated to the contrary. In particular, any feature indicated as being preferred or advantageous may be combined with any other feature or features indicated as being preferred or advantageous. It shall be understood that features introduced by expressions such as "in some embodiments", "typically", or "preferably", are optional features, which are not essential to the invention, but may depict advantageous embodiments.

Reference throughout this specification to 'one embodiment', "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the claimed embodiments can be used in any combination.

The present disclosure relates to ammonia burners and their components, and provides a rim and a catalyst support structure comprising that rim. The rim is a highly effective structure for accommodating thermal strain during normal operation of ammonia burners. During normal operation in an ammonia burner, the rim is attached to the reactor wall, and it supports a body comprising a catalyst.

Accordingly, provided herein is a rim for a catalyst support system. It can be used in various processes involving high-temperature catalytic processes and is especially suited for use in ammonia oxidation burners. The rim comprises a top flange and an inner wall. The top flange comprises a planar section, a rounded outer edge, and a rounded inner edge. The rounded outer edge and the rounded inner edge are separated by the planar section. The rim is typically an annular structure formed by the aforementioned rounded outer edge, rounded inner edge, planar section, and inner wall. The rounded inner edge is closer to the center of the annular structure than the planar section, and the planar section is closer to the center of the annular structure than the rounded outer edge.

The present rim is highly effective at avoiding the occurrence of excessive thermal stresses, thereby extending the useful of ammonia burner baskets, and increasing the efficiency of ammonia oxidation processes. It comprises few parts, which makes it particularly easy to manufacture and to install. In addition, the structure only comprises a limited amount of welds, which limits the amount of positions which are vulnerable to stress-induced cracking. The present rim is further robust, works efficiently, and because it has a reduced propensity of cracking, it reduces the amount of ammonia bypass during normal operation of an ammonia burner in which the present rim is used. Additionally, the present rim is easy to maintain.

The term "rounded outer edge" as used herein refers to the outer part of the top flange. It might be described as being a curved structure. During operation of an ammonia burner, it may be connected to the ammonia burner's reactor wall. Such a connection between the rim and the reactor wall is named an upper rim attachment to the reactor wall. In some embodiments, the rounded outer edge is connected to the reactor wall by means of a welding seam and/or by means of a rim support. A rim support is an annular edge attached to the reactor wall on which the rounded outer edge rests.

Alternatively, the rim may comprise an outer wall, and the rounded outer edge is connected to the rim's outer wall which, during normal operation, is connected to the reactor wall. A connection between the rim's outer wall and the reactor wall is named a lower rim attachment to the reactor wall. It is also possible that both the rounded outer edge and the rim's outer wall are connected to the reactor wall. Generally, the connection between the reactor wall and the rounded outer edge and/or the rim's outer wall is a weld. Accordingly, a strong connection between the reactor wall and the rim can be formed.

Typically, the thickness of the outer wall is substantially uniform. In other words, the thickness of the outer wall is typically constant within a margin of error of 10%, preferably 5%, more preferably 1%. Without being bound by theory, a uniform thickness of the rim may lead to a uniform distribution of thermal stress and a reduced risk of cracking.

The term "rounded inner edge" as used herein refers to the inner part of the top flange. It might be described as being a curved structure which connects the top flange with the inner wall.

The term "planar section" as used herein refers to a substantially flat part of the top flange between the rounded inner edge and the rounded outer edge. It is an annular structure which, during normal operation, increases the distance between the rim's inner wall and the ammonia burner's reactor wall. Accordingly, thermal strain can be effectively accommodated in the rim.

It will be understood that in practice, the planar section does not necessarily need to be perfectly planar, but it might be more or less curved. For example, the radial cross section of the planar section may describe an arc subtending an angle of less than 10°, less than 5°, or less 1°. Increasing the curvature of the planar section may decrease the flexibility of the rim. Accordingly, the planar section is typically substantially planar.

Typically, the top flange has a thickness which is substantially uniform. In other words, the thickness of the top flange is typically constant within a margin of error of 10%, preferably 5%, more preferably 1%. However, the thickness of the walls is not a key parameter as long as the walls are thick enough to bear the appropriate loads under normal operating conditions and with appropriate allowances for corrosion (e.g. by oxidation).

The inner wall comprises a carrier plate, a gauze shelf, and a bottom plate shelf. The gauze shelf and the bottom plate shelf are attached to the carrier plate. The carrier plate is attached to the top flange at the rounded inner edge. Additionally or alternatively, the inner wall can be described as follows: the inner wall comprises a carrier plate, which in turn comprises an upper edge and a lower edge. At its upper edge, the carrier plate is connected to the rounded inner edge of the top flange. At its lower edge, the bottom plate shelf is connected to the carrier plate. In between the carrier plate's upper and lower edge, the gauze shelf is attached to the carrier plate. During normal operation, the gauze shelf supports catalyst gauzes, and the bottom plate shelf supports a bottom shelf, typically a free-floating honeycomb structure.

Preferably, the carrier plate is planar. The carrier plate is typically formed from a single sheet of metal. Thus the construction of the carrier plate is simplified and the carrier plate does not comprise weak spots such as welds, which increases its resilience during normal operation. Preferably, the carrier plate has a uniform thickness. Alternatively put, the thickness of the carrier plate is preferably constant within a margin of error of 10%, preferably within a margin of error of 5%, more preferably within a margin of error of 1%. This reduces thermal stresses in the carrier plate.

In some embodiments, the planar section has a width of 2.0 cm to 20.0 cm, preferably a width of 2.0 to 10.0 cm. This helps obtaining proper thermal insulation between catalyst gauzes and the reactor wall during normal operation of an ammonia burner in which the rim is used.

In some embodiments, the rounded outer edge and/or the rounded inner edge have a radius of curvature of at least 20 to at most 100 mm, preferably of 25 to at most 50 mm. A larger radius greater than 75 mm may reduce the amount space available for the planar section and thus reduce the available catalyst surface area. The radius of curvature helps mitigate excessive thermal stresses in the rim.

In some embodiments, the ratio of the width of the planar section and the radius of curvature of the rounded outer edge is between 0.50 to 10.0, preferably the ratio of the width of the planar section and the radius of the curvature of the rounded outer edge is between 2.5 and 3.0. This helps mitigating excessive thermal stresses in the rim. Also, it helps obtaining proper thermal insulation between catalyst gauzes and the reactor wall.

In some embodiments, the ratio of the width of the planar section and the radius of curvature of the rounded inner edge is between 0.50 to 10.0, preferably the ratio of the width of the planar section and the radius of the curvature of the rounded inner edge is between 2.5 and 3.0. This helps mitigating excessive thermal stresses in the rim. Also, it helps in obtaining proper thermal insulation between the catalyst gauzes and the reactor wall.

In some embodiments, the radius of curvature of the rounded outer edge equals the radius of curvature of the rounded inner edge within a margin of error of 10.0%, preferably 5.0%, more preferably 2.0%, most preferably 1.0%.

In some embodiments, the top flange has a thickness between 2 and 6 mm, for example between 3 and 5 mm.

In some embodiments, the rim is an annular structure having an outer diameter between 1 m and 7 m, more typically between 3 m and 7 m but high pressure plants typically have a rim with an outer diameter from 1 to 1.5 m.

In some embodiments, the ratio of the width of the planar section and the rim's outer diameter is between 30 and 550.

In some embodiments, the carrier plate has a thickness between 3 mm and 12 mm, preferably a thickness between 4 and 6 mm.

In some embodiments, the carrier plate has a length of 300 to 400 mm.

In some embodiments, the ratio of the length of the carrier plate and its thickness is between 25 and 100.

In some embodiments, the ratio of the length of the carrier plate and the width of the planar section is between 1.5 and 8.

These characteristics help ensuring that the catalyst can be effectively supported and the rim remains flexible, which helps accommodating thermal stresses.

The gauze shelf is typically formed as a plate which is attached to the carrier plate.

Typically, the gauze shelf is welded to the carrier plate. In some embodiments, the gauze shelf has a thickness of 3 to 20 mm thickness, preferably a thickness between 6 and 12 mm. In some embodiments, the width of the gauze shelf is 30 mm to 90 mm, preferably between 50 and 70 mm. Preferably, the gauze shelf is oriented at an angle of 90° with respect to the carrier plate. In some embodiments, the ratio of the width of the gauze shelf to the thickness of the gauze shelf is between 1.5 and 18. In some embodiments, the ratio of the width of the gauze shelf to the width of the planar section is between 0.15 and 1.8. This allows effectively supporting catalyst gauzes while also allowing to accommodate for thermal expansion during normal use.

In some embodiments, the gauze shelf comprises a plurality of expansion slits. Preferably, the expansion slits are 0.25 to 0.5 times the thickness of the shelf. In typical embodiments, this may correspond to between 1 and 2 mm wide. The expansion slits preferably end in a hole, more preferably a circular hole, most preferably a circular hole having a diameter of 3 mm to 12 mm, for example a diameter between 5 and 10 mm. Preferably, the length of the expansion slits is 20 to 50 mm, more preferably 25 to 40 mm. Preferably, the distance between adjacent expansion slits in the gauze shelf is 120 mm to 180 mm.

In some embodiments, the expansion slits extend through 20 to 70% of the width of the gauze shelf, for example though 40 to 50% of the gauze shelf. In some embodiments, the ratio of the length of the expansion slits to the width of the expansion slits is between 7.5 and 35. In some embodiments, the ratio of the diameter of the circular hole to the width of the expansion slits is between 1 and 7.

Preferably, the rim is an annular structure and the expansion slits are aligned in radial directions. Equivalently put, the expansion slits are preferably perpendicularly oriented to the ring-shaped edges of the gauze shelf.

In some embodiments, the gauze shelf is attached to the carrier plate by means of welding at a distance of 6.0 to 10.0 cm from the top of the carrier plate, wherein the expression "top of the carrier plate" denotes the position where the carrier plate ends and where the rounded inner edge starts. In some embodiments, this distance is between 0.3 and 2 times the width of the planar section.

A thusly designed gauze shelf gives rise to lower thermal stresses compared to gauze shelves in existing systems.

In some embodiments, the bottom plate shelf has a thickness of 3 to 20 mm, preferably a thickness between 6 and 12 mm. In some embodiments the ratio of the width of the bottom plate shelf and its thickness is between 2 and 14. Preferably, the bottom plate shelf is oriented at an angle of 90° with respect to the carrier plate.

In some embodiments, the bottom plate shelf has a width between 40 and 100 mm. In some embodiments, the ratio of the width of the bottom plate shelf and the width of the planar section is between 0.8 and 1.4. Preferably, the bottom plate shelf makes an angle between 88° and 92°, more preferably an angle of 90.0°, with the carrier plate.

In some embodiments, the bottom plate shelf comprises a plurality of expansion slits. Preferably, the expansion slits are 1 mm to 2 mm wide. The expansion slits preferably end in a hole, more preferably a circular hole, most preferably a circular hole having a diameter of 3 mm to 12 mm. Preferably, the length of the expansion slits is 15 to 70 mm, more preferably 20 to 40 mm. Preferably, the distance between adjacent expansion slits in the bottom plate shelf is 120 mm to 180 mm. Preferably, the rim is an annular structure and the expansion slits are aligned in radial directions. Equivalently put, the expansion slits are preferably perpendicularly oriented to the ring-shaped edges of the bottom plate shelf.

In some embodiments, the expansion slits extend through 20 to 70% of the width of the bottom plate shelf, for example though 40 to 50% of the bottom plate shelf. In some embodiments, the ratio of the length of the expansion slits to the width of the expansion slits is between 7.5 and 35. In some embodiments, the ratio of the diameter of the circular hole to the width of the expansion slits is between 1 and 7. The expansion slits reduce thermal stresses in the gauze shelf and in the bottom plate shelf.

The top flange and the carrier plate may be formed out of a single sheet of metal, or they may be made of several sheets of metal which are welded together. Preferably, the top flange and the carrier plate, taken together, are formed of no more than two metal sheets, and comprise at most one weld. Preferably, the at most one weld is present between the planar section and the rounded inner edge of the top flange. Alternative methods for production of the rim could include diffusion bonding, friction stir welding or an extrusion, with a final weld, however, welding is the most commonly used technique. Accordingly, the rounded outer edge and the planar section are preferably made out of a single sheet of metal, the rounded inner edge and the carrier plate are preferably made out of another single sheet of metal, and the two sheets of metal are preferably welded together at the point where the planar section and the rounded inner edge meet. Thus a rim is provided which is particularly easy to assemble, and which is highly effective at accommodating thermal strain.

In some embodiments, the rim comprises an outer wall. In such embodiments, the top flange and the outer wall may be made from a single sheet of metal, or they may be made from more than one sheets of metal, e.g. two sheets of metal, which are welded together. In some embodiments, the outer wall is welded to the rounded outer edge.

In some embodiments, the rim further comprises a wave breaker ring. The wave breaker ring is attached to the carrier plate between the bottom plate shelf and the gauze shelf. Without being bound by theory, the ring assists in ensuring that the wave breaker effectively prevents ammonia by-pass along the rim during all operating conditions including start-up, normal operation, shut-down, re-start, etc.

In some embodiments, the wave breaker ring has a width between 10.0 and 20.0 mm, preferably the wave breaker ring has a width of 15.0 mm. In some embodiments, the width of the wave breaker ring is between 0.05 and 2 times the width of the planar section.

In some embodiments, the wave breaker ring has a thickness between 10.0 and 20.0 mm, preferably the wave breaker ring has a thickness of 15.0 mm. In some embodiments, the thickness of the wave breaker ring is between 0.05 and 2 times the width of the planar section.

In some embodiments, the width of the wave breaker ring equals the thickness of the wave breaker ring within a margin of error of 10%, preferably 5%, more preferably 2%, even more preferably 1%.

Preferably, the distance between the bottom plate shelf and the wave breaker ring is between 100 mm and 200 mm, more preferably 120-150 mm. One or more wave breakers can be attached to the wave breaker ring, for example one or more wave breakers as disclosed in WO2004005187. These wave breakers help maintaining a uniform distribution of packing material, which reduces the risk of catalyst gauze breakage. The distance between the bottom plate shelf and the wave breaker ring is based on a mid-point between the height of the catalyst, the angle of the wave breaker (for example 30°) and the necessity of allowing access to the ring after having installed the wave breakers.

Further provided is a catalyst support system for ammonia oxidation burners comprising a rim as disclosed herein. The catalyst support system further comprises a body. The body comprises one or more catalyst gauzes and a bottom plate. In some embodiments, the bottom plate comprises a honeycomb structure.

During normal use, the gauze shelf supports the one or more catalyst gauzes and the bottom plate shelf supports the bottom plate. The present rim allows for highly efficient accommodation of thermal strain of the catalyst gauzes and the bottom plate.

In some embodiments, a packing material is provided between the bottom plate and the one or more catalyst gauzes. The packing material may comprise an $N_2O$ abatement catalyst.

When a packing material is provided between the bottom plate and the one or more catalyst gauzes, one or more wave breakers are preferably provided. They allow avoiding the formation of ditches deeper than ca. 20-30 mm in the packing, thereby preventing tearing of the catalyst gauzes and bypassing of process gas. Suitable wave breakers are disclosed in WO2004005187 which is incorporated herein by reference.

The wave breaker preferably comprises a perforated plate which is oriented at an angle between 20° and 40°, for example at an angle of 30°, with respect to the bottom plate.

The wave breaker further comprises a top. During normal use, the top of the wave breaker is 10-50 mm, preferably 20-40 mm removed from the one or more gauzes. During normal use, the top of the wave breaker is positioned below the one or more gauzes. Preferably, the wave breaker will have freedom to move both horizontally and vertically and can be held in place with the use of an L-profile welded to the wave breaker ring. The wave breakers help to maintain a uniform distribution of packing material, which reduces the risk of catalyst gauze breakage.

Preferably, the rim and the body of the catalyst support structure are made from a nickel-iron-chromium alloy. Such alloys suitably resist the high temperatures and chemical environment which occurs during normal operation of ammonia burners.

Further provided herein is an ammonia burner comprising a reactor vessel and a catalyst support system as provided herein. The reactor vessel comprises a reactor wall, and the catalyst support system may be attached to the reactor wall by means of one or more welds. Additionally or alternatively, the catalyst support system may be attached to the reactor wall by means of a rim support. Preferably, the rounded outer edge is welded to the reactor wall.

In some embodiments, a heat shield is installed between the catalyst support system and the reactor wall. In some embodiments, one or more wall coils are attached to the reactor wall. The wall coils can protect the pressure vessel from overheating and can cool down the outer wall. In these embodiments, the heat shield is installed between the catalyst support system and the wall coils. In some embodiments, the heat shield has a thickness between 1 mm and 2 mm. The heat shield helps ensuring that the entirety of the lower part of the catalyst support structure operates at a temperature higher than 800° C. during normal operating conditions. Also, it reduces the heat flux to the reactor wall and the wall coils. Accordingly, the heat shield reduces thermal stresses and provides energy savings. In addition, the heat shield helps ensuring that weld seams at or near the reactor wall are kept at conditions which are outside of the range which is critical for stress-induced cracking: in particular, operating conditions involving high tensile strain (E>0.001) localised on a weld seam, and a temperature in the range of 500–750° C., are preferably avoided.

Preferably, the distance between the rim's inner wall and the wall coils is 25 mm to 40 mm but may be larger or smaller depending on the rim diameter. This ensures that sufficient space is provided between the catalyst support structure and the wall coils to allow for thermal dilation; during normal use, thermal dilation of the catalyst support structure is significantly higher than that of the wall coils because the catalyst support structure is operated at a significantly higher temperature than the wall coils.

In some embodiments, the ammonia burner is provided with a plurality of counter weights. During normal use, the hold-down weights are positioned on the gauze shelf, and clamp the catalyst gauzes. Preferably, the individual hold-down weights have a mass of less than 25 kg, more preferably of less than 20 kg, even more preferably less than 15 kg. In some embodiments, a total of 10 to 25 counter weights are provided. In some embodiments, the height of the counter weights is between 60 mm and 100 mm. In some embodiments, the ratio of the height of the counter weights and the width of the planar section is between 0.3 and 2. The counter weights efficiently keep the catalyst gauzes in place.

In some embodiments, one or more heat shields are provided on top of the one or more counter weights. Preferably, the one or more heat shields have a height between 50 mm and 250 mm. In some embodiments, the ratio of the height of the heat shields and the width of the planar section is between 0.25 and 2. The heat shields reduce heat losses to the reactor wall and may also reduce radiation that may affect the upper part of the rim.

In some embodiments, one or more handles are provided on top of the one or more counter weights. Preferably, the one or more handles have a height between 2.5 and 7.5 cm. In some embodiments, two handles are provided on each counterweight.

Preferably, the one or more counterweights are bent. They preferably have the same radius of curvature of the ring. In some embodiments, the one or more counter weights are bent over an angle of 10° to 30° over their entire length.

In some embodiments, the one or more counter weights comprise an assembly rod at a first end and an assembly sheath at a second end. During normal use, the assembly rod and the assembly sheath of adjacent counter weights slidingly engage, thus forming a slidingly releasable connection between adjacent counter weights.

In some embodiments, the assembly rod has a length between 3.0 cm and 7.0 cm; and the assembly sheath has a length between 3.0 cm and 7.0 cm. Preferably, the assembly rod has a width between 0.8 cm and 1.2 cm. Preferably, the assembly sheath has a width between 1.0 cm and 1.4 cm. Preferably, the assembly sheath has a width which is 1.0 to 3.0 mm wider.

Preferably, both the assembly rod and the assembly sheath comprise blunted corners. The blunted corners feature an oblique edge which is oriented at an angle of 30° to 60° with respect to the corresponding end of the counter weight.

The assembly rod and assembly sheath allow easy installation of the counter weights. Also, during normal operation, the assembly rod can slide in the assembly sheath, thereby efficiently accommodating thermal dilation with a minimum amount of thermal stresses in the counter weights.

Further provided herein is the use of a rim according to the present disclosure for the catalytic oxidation of ammonia.

Further provided herein is the use of a catalyst support system according to the present disclosure for the catalytic oxidation of ammonia.

Further provided herein is the use of an ammonia burner according to the present disclosure for the catalytic oxidation of ammonia.

Further provided herein is a method for oxidizing ammonia. The method comprises the steps: 1) providing an ammonia burner according to the present disclosure; 2) directing an air-ammonia mixture over the one or more catalyst gauzes; and, 3) catalytically oxidizing the ammonia.

EXAMPLES

Example 1

In a first example, reference is made to FIG. 1 which shows a radial cross section through a rim (100). The rim (100) is an annular structure comprising a top flange (110) and an inner wall (120). The top flange (110) comprises a planar section (111), a rounded outer edge (112), and a rounded inner edge (113). The inner wall (120) comprises a carrier plate (121), a gauze shelf (122), and a bottom plate shelf (123). The gauze shelf (122) and the bottom plate shelf (123) are attached to the carrier plate (121).

Example 2

Figure 2:
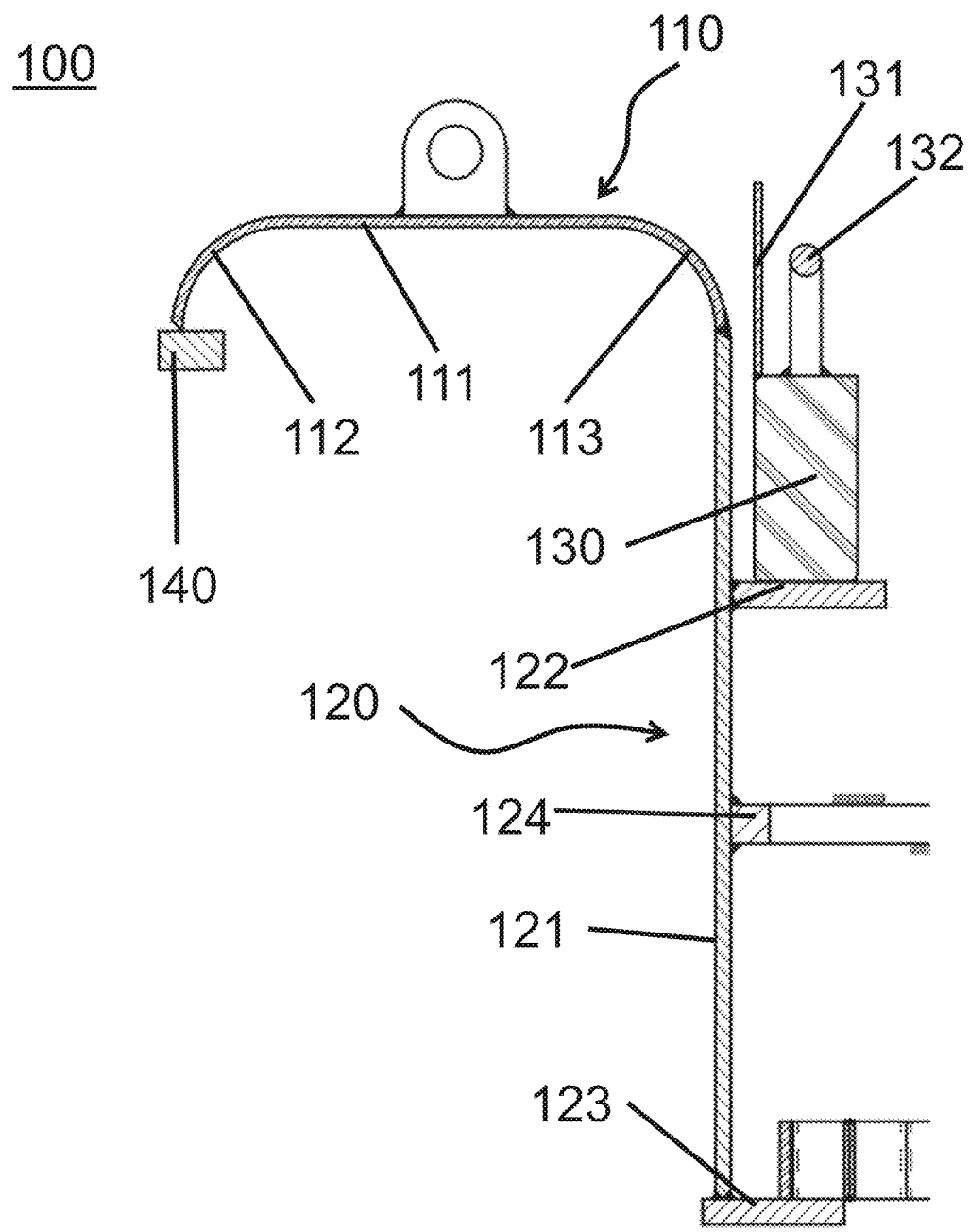
FIG. 2 shows a radial cross section through a rim (100).

In a second example, reference is made to FIG. 2 which shows a radial cross section through a rim (100). The rim (100) is an annular structure comprising a top flange (110) and an inner wall (120). It has an outer diameter of 4.92 m.

The top flange (110) comprises a planar section (111), a rounded outer edge (112), and a rounded inner edge (113). The top flange (110) is manufactured from sheet metal and has a thickness of 4.0 mm. The planar section (110) has a width of 13.2 cm. Both the rounded outer edge (112) and the rounded inner edge (113) have a radius of curvature of 4.4 cm. The rounded outer edge (112) is connected to a reactor wall (not shown) by means of a rim support (140). The rounded inner edge (113) is welded to the inner wall (120).

The inner wall (120) comprises a carrier plate (121), a gauze shelf (122), a bottom plate shelf (123), and a wave breaker ring (124). The gauze shelf (122), the bottom plate shelf (123), and the wave breaker ring (124) are attached to the carrier plate (121). The carrier plate (121) has a thickness of 6.0 mm and a width of 337.5 mm. The gauze shelf (122) has a thickness of 1.0 cm and a width of 6.0 cm. The gauze shelf (122) makes an angle of 90° with the carrier plate (121) and is attached to the carrier plate by means of welding at a distance of 8.0 cm from the top of the carrier plate, i.e. from the position where the carrier plate (121) ends and where the rounded inner edge (113) starts. The bottom plate shelf (123) has a thickness of 10 mm and a width of 55 mm, and makes an angle of 90.0° with the carrier plate (121). The wave breaker ring (124) has a thickness and a width of 15 mm and is positioned at a distance of 138 mm from the bottom plate shelf (123).

18 counter weights (130) are positioned on the gauze shelf (122). The counter weights (130) clamp down catalyst gauzes and/or catalyst supports during normal use of an ammonia burner in which the instant rim (100) is used. The counter weights (130) have a height of 8.0 cm. On the counterweights' (130) top, a heat shield (131) and a handle (132) are positioned. The heat shield (131) has a height of 75 mm. The handle (132) has a height of 51 mm.

Example 3

Figure 3:
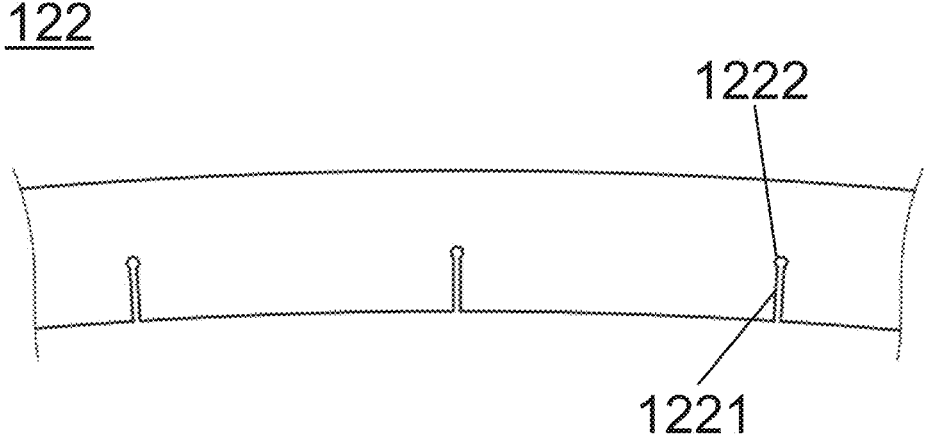
FIG. 3 shows a gauze shelf (122) and a bottom plate shelf (123).
Figure 3:
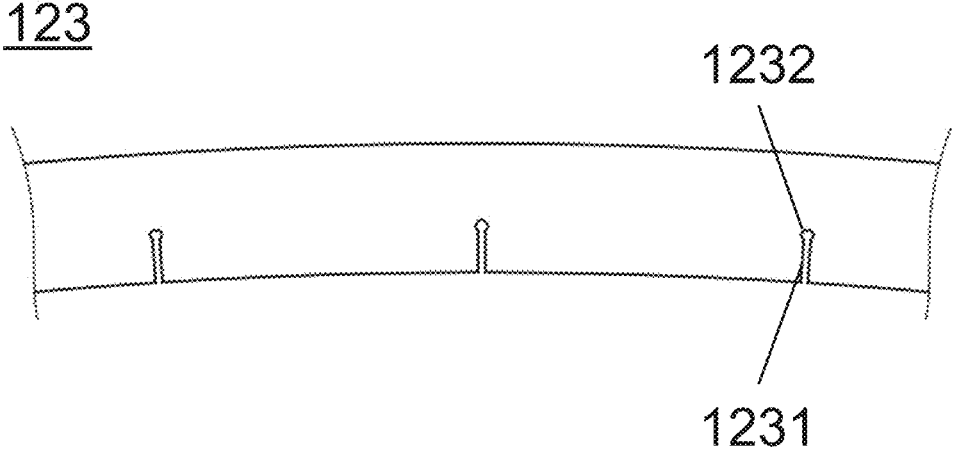

In a second example, reference is made to FIG. 3. FIG. 3 shows a gauze shelf (122) and a bottom plate shelf (123). Both the gauze shelf (122) and the bottom plate shelf (123) comprise a 100 expansion slits (1221, 1231). The expansion slits (1221, 1231) end in a circular hole (1222, 1232). The gauze shelf (122) and the bottom plate shelf (123) are annular structures, and the expansion slits (1221, 1231) are aligned with radial directions. Equivalently put, the expansion slits (1221, 1231) are perpendicular to the ring-shaped edges of the gauze shelf (122) and the bottom plate shelf (123).

The expansion slits (1221) of the gauze shelf (122) are 3 mm wide and 25 mm long. The corresponding holes (1222) have a radius of 2.5 mm. The expansion slits (1231) of the bottom plate shelf (123) are 3 mm wide and 20 mm long. The radius of the corresponding holes (1232) is 2.5 mm.

Example 4

Figure 4:
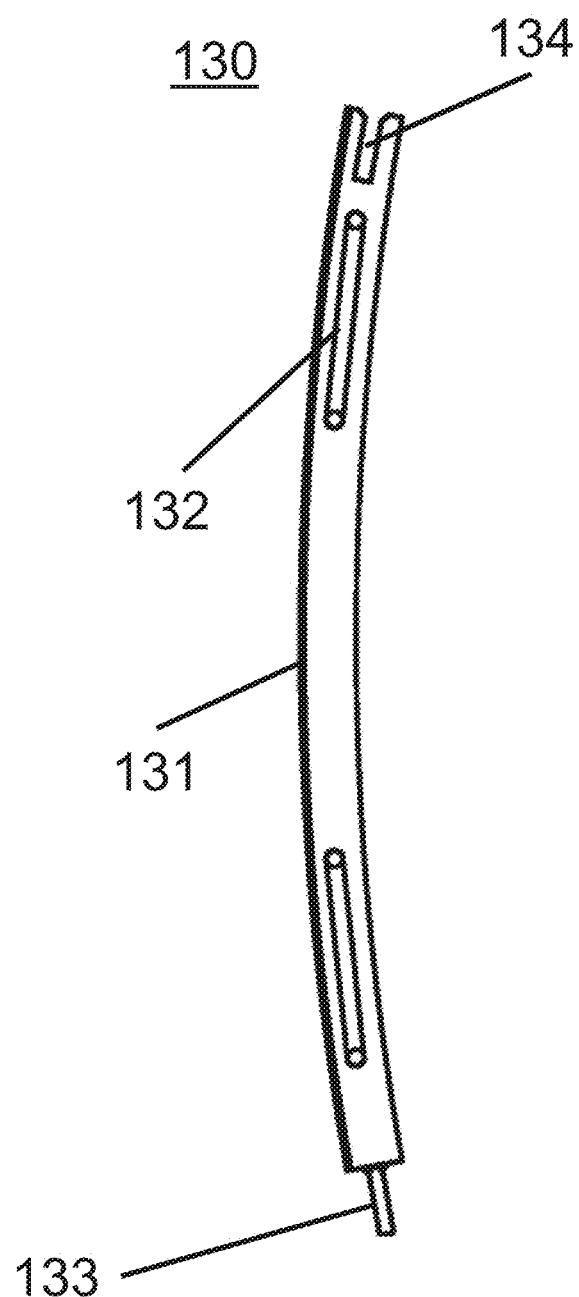
FIG. 4 shows a counter weight (130).

In a third example, reference is made to FIG. 4. FIG. 4 shows a top-view of a counter weight (130) as provided herein. A total of 18 counter weights are commonly used in an ammonia burner to clamp the catalyst gauzes.

The counter weight (130) comprises a heat shield (131), two handles (132), an assembly rod (133), and an assembly sheath (134).

The counter weight is bended over an angle of 20° over its entire length. The bending angle over the distance between two corresponding points on the two handles is 12°.

The height of the counter weight (130), excluding the height of the handle (132) and heat shield (131), is 80 mm. The handle is 157 mm long, and 45 mm long. It is shaped as a bended rod having a diameter of 12 mm. The heat shield is 75 mm high and 3 mm thick.

The assembly rod (133) protrudes from a first end of the counter weight (130) and the assembly sheath (134) is formed as an incision at a second end of the counter weight (130). During normal operation, each assembly rod (133) is slid into the assembly sheath of an adjacent counter weight (130) such that a closed ring of counter weights is formed. The assembly rod is 50 mm long and 10 mm wide. The assembly sheath is 50 mm long and 12 mm wide.

Example 5

Figure 5:
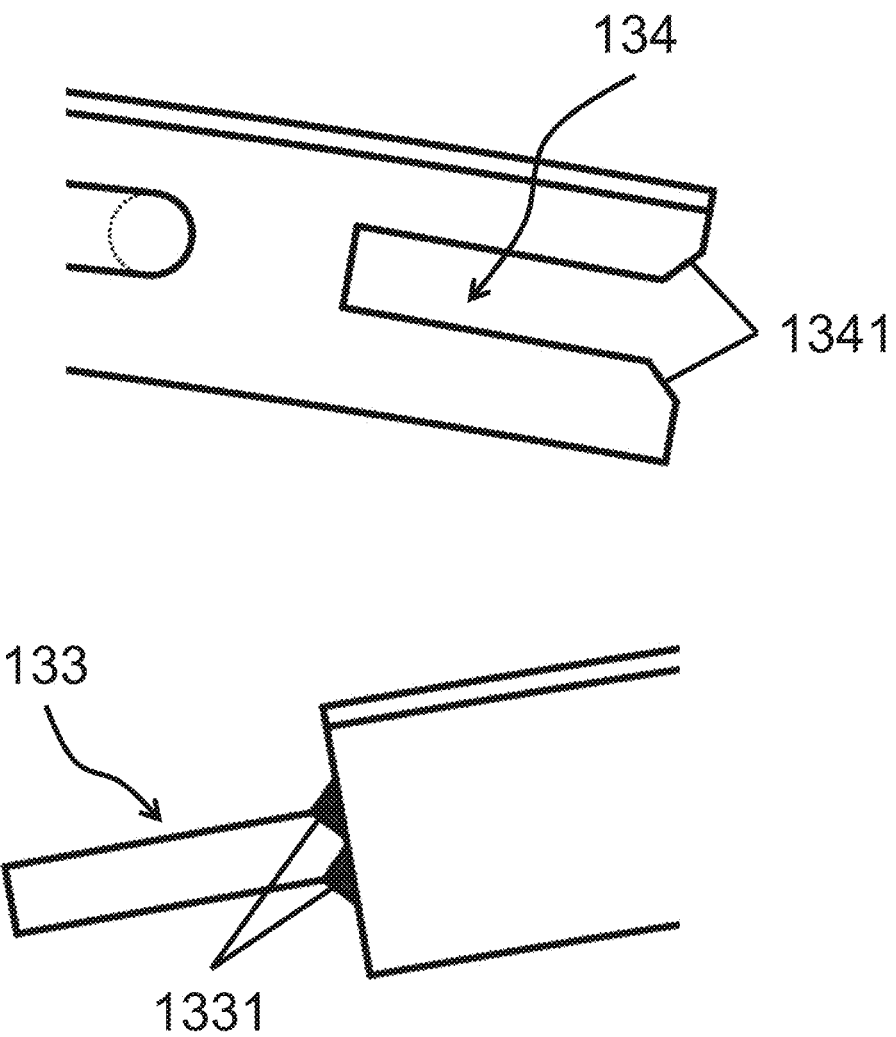
FIG. 5 shows a close-up of an assembly rod (133) and an assembly sheath (134).

In a fourth example, reference is made to FIG. 5, which shows a close-up of an assembly rod (133) and an assembly sheath (134). Both the assembly rod (133) and the assembly sheath (134) comprise blunted corners (1331, 1341). These blunted corners (1331, 1341) feature an oblique edge which is oriented at an angle of 45° with respect to the corresponding end of the counter weight.

Example 6

Figure 6:
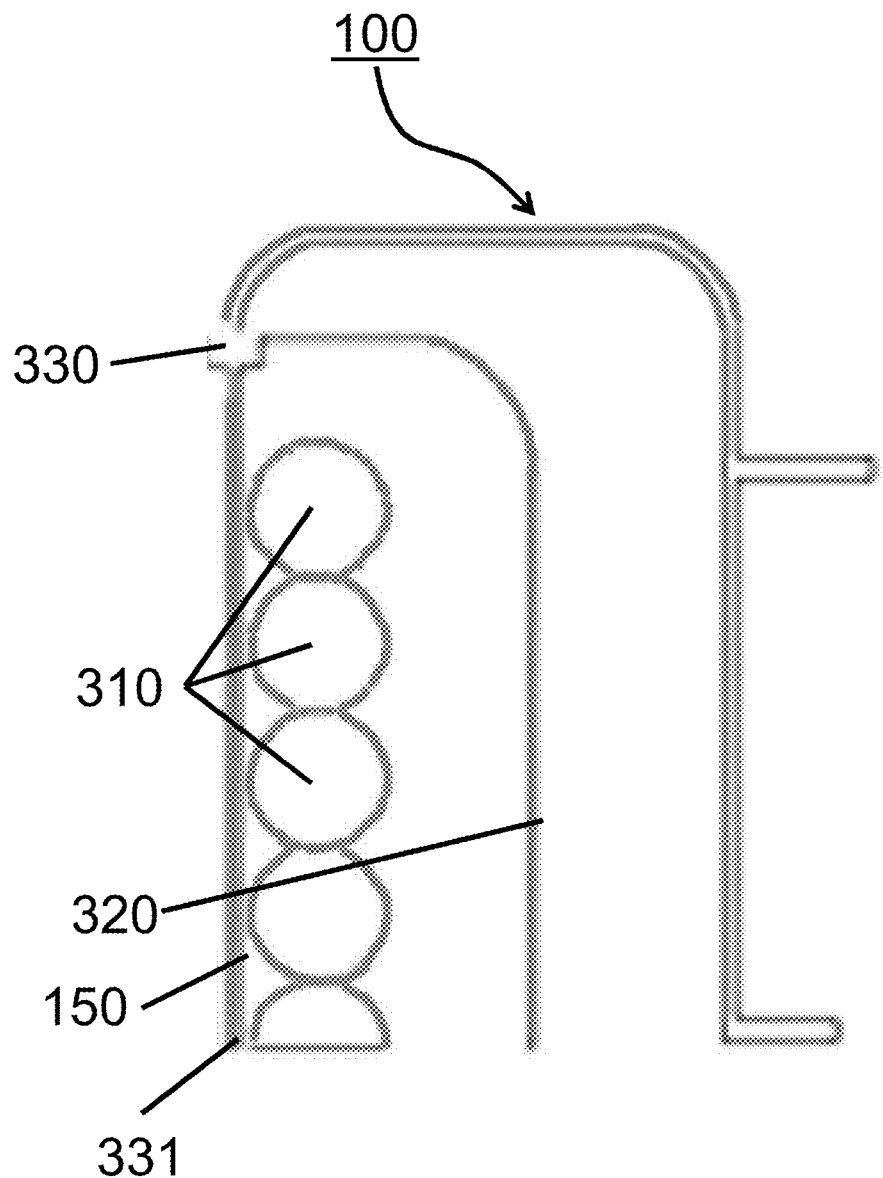
FIG. 6 shows a rim (100) attached to a reactor wall (300)

In a sixth example, reference is made to FIG. 6, which shows a rim (100) attached to a reactor wall. Wall coils (310), for cooling down the outer wall (150), are attached to the reactor wall. The wall coils (310) are thermally insulated from the rim (100) by means of a heat shield (320). The rim (100) comprises an outer wall (150) which is adjacent to the reactor wall. The rim (100) is attached to the reactor wall by means of a lower rim attachment (331) between the rim's outer wall (150) and the reactor wall. The rim (100) is attached to the heat shield (320) by means of an upper rim attachment (330).

Example 7

Figure 7:
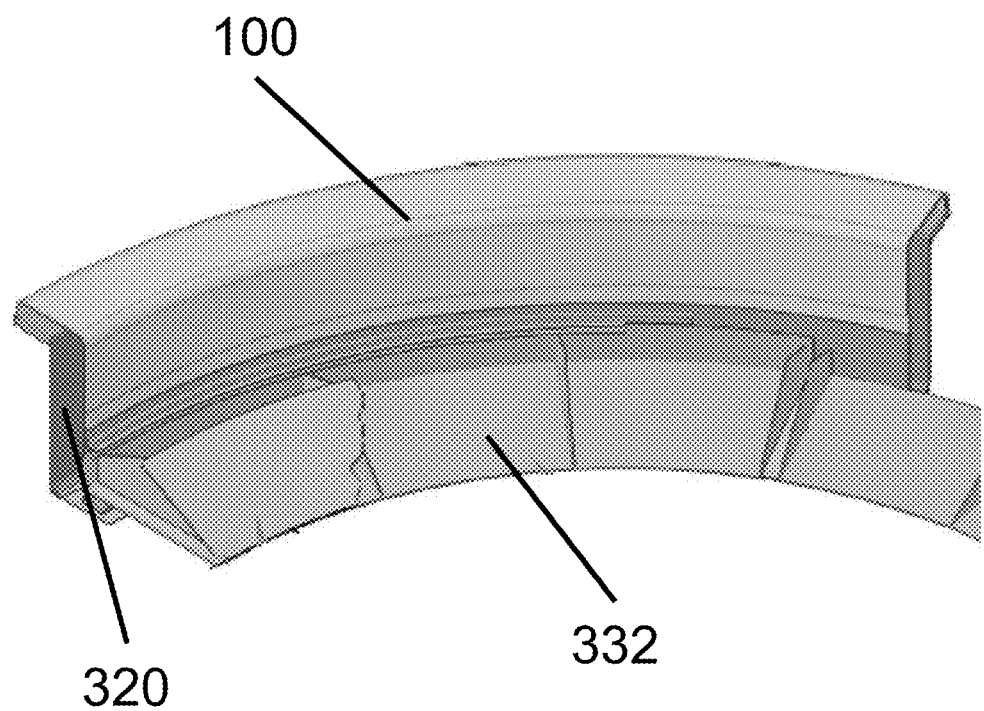
FIG. 7 shows a part of a support structure for an ammonia oxidation catalyst.

In a sixth example, reference is made to FIG. 7, which shows part of a support structure for an ammonia oxidation catalyst. In particular, a rim (100) is provided at the perimeter of the support structure. At its outer side, the rim (100) is adjacent to a heat shield (320). At its inner side, the rim (100) is adjacent to a wave breaker (332).

Example 8

Figure 8:
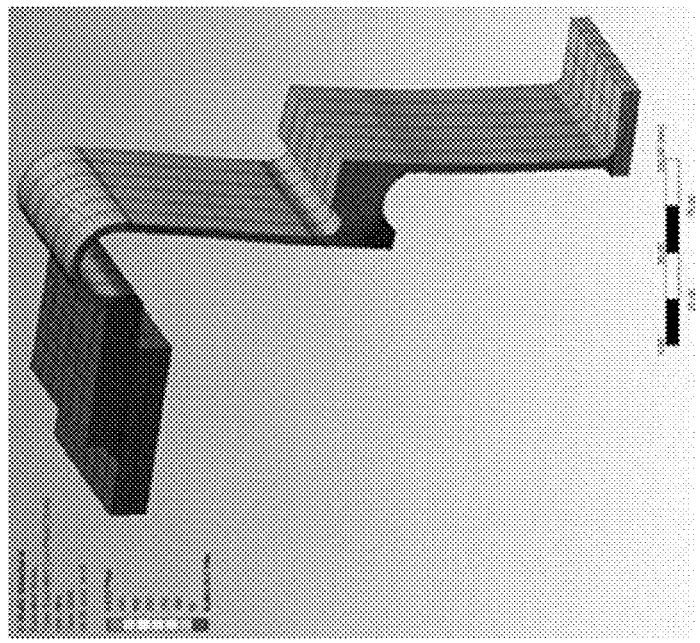
FIG. 8 shows a comparison of thermal stresses in the rims (100) of two catalyst support structures.
Figure 8:
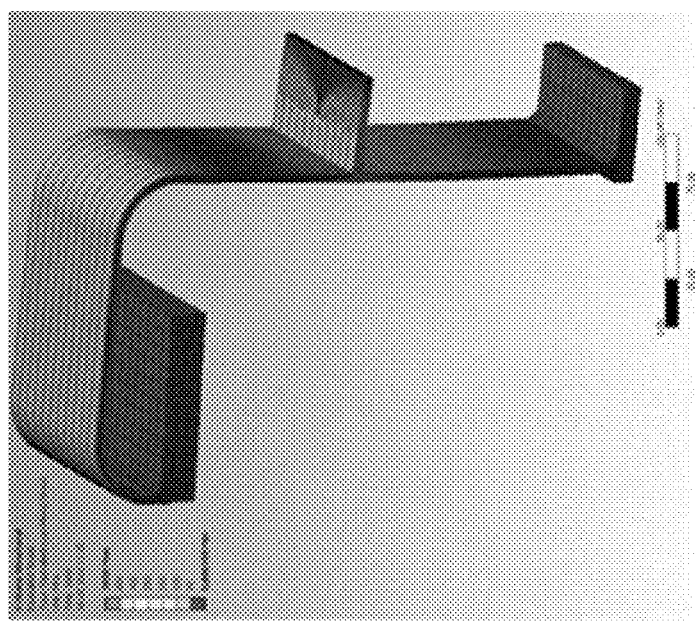

In an eight example, reference is made to FIG. 8 which shows a comparison of thermal stresses in a rim 8a of a catalyst support structure as provided herein with thermal stresses in a rim 8b according to an Uhde design (see e.g. R. Buchenau, The catalyst basket—How to prolong the service life, paper presented at the $3^{rd}$ UHDE Nitric Acid Symposium, Dortmund, 26-28 May 1986). In particular, the Von Mises stress is shown in MPa 50 minutes after ammonia burner start-up. It is apparent that rims according to the present disclosure result in significantly lower thermal stresses than the Uhde design of the prior art Example 9

Figure 9:
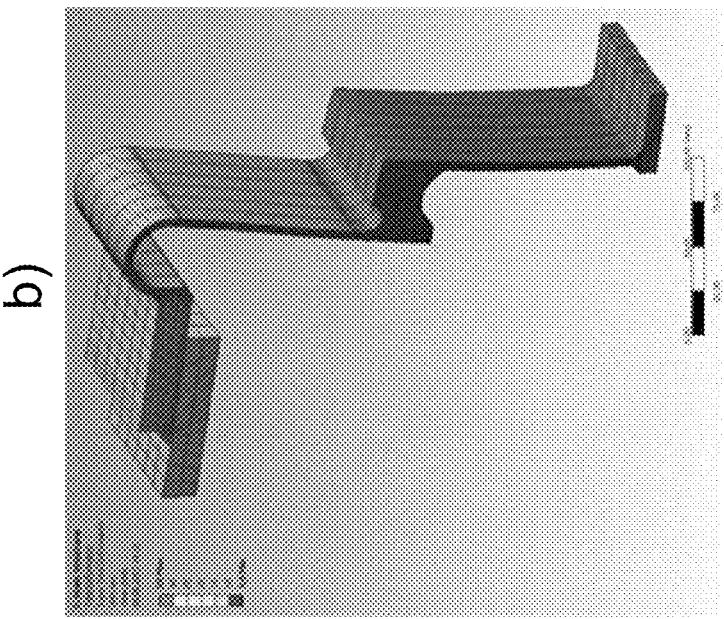
FIG. 9 shows a comparison of thermal deformation in the rims (100) of two catalyst support structures.
Figure 9:
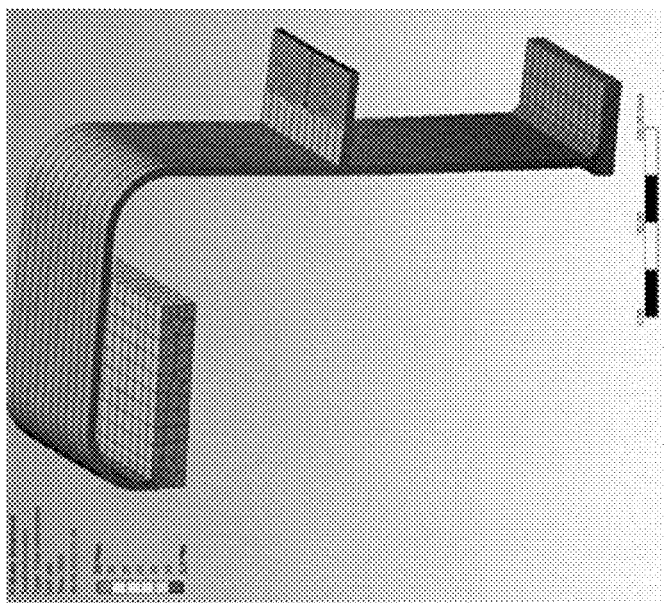

In a ninth example, reference is made to FIG. 9 which shows a comparison of deformations in a rim 9a of a catalyst support structure as provided herein with thermal stresses in a rim 9b according to an Uhde design (see e.g. R. Buchenau, The catalyst basket—How to prolong the service life, paper presented at the $3^{rd}$ UHDE Nitric Acid Symposium, Dortmund, 26-28 May 1986). In particular, deformations are shown as they occur 50 minutes after reactor start-up. The rims according to the present disclosure show less strain/stress than the Uhde design of the prior art. Reduced stress will result in a more uniform deformation and improved longevity.

Example 10

Figure 10:
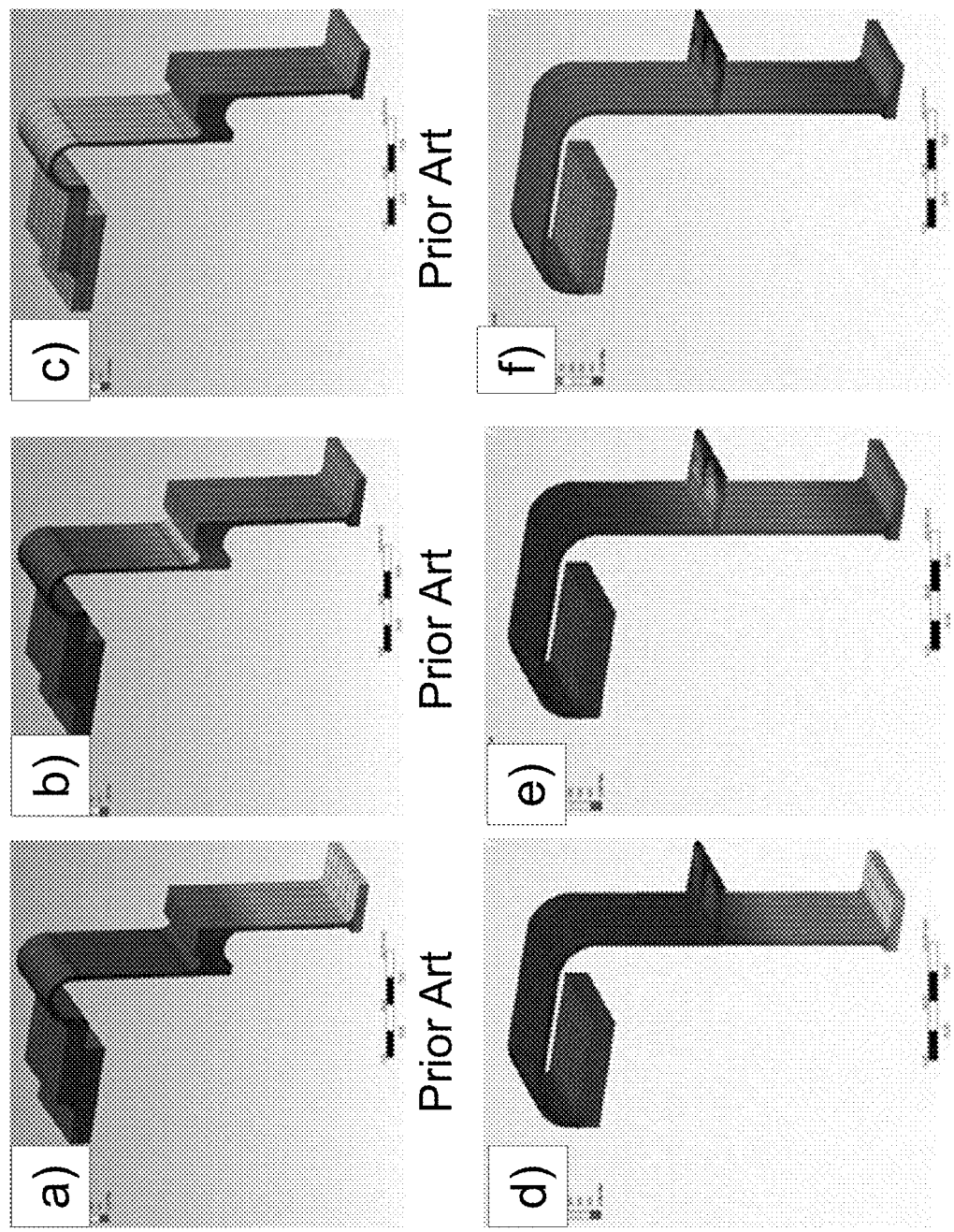
FIG. 10 shows a comparison of temperatures in the rims (100) of two catalyst support structures, at several times after reactor start-up.

In a tenth example, reference is made to FIG. 10 which shows temperature profiles in a rim of a catalyst support structure as provided herein (panels d-f) compared with temperature profiles in a rim according to an Uhde design (panels a-c, see e.g. R. Buchenau, The catalyst basket—How to prolong the service life, paper presented at the $3^{rd}$ UHDE Nitric Acid Symposium, Dortmund, 26-28 May 1986). In particular, temperature profiles are shown at 5 minutes after reactor start up (panels a and d), at 15 minutes after reactor start up (panels b and e), and at 50 minutes after reactor start up (panels c and f). The temperature changes in the rims of the present disclosure feature more gradual temperature changes than the rims of the Uhde design.

We claim:
1. A rim for a catalyst support system for ammonia oxidation burners comprising a top flange and an inner wall,
   the top flange comprising a planar section, a rounded outer edge, and a rounded inner edge, the rounded outer edge and the rounded inner edge being separated by the planar section;
   the inner wall comprising a carrier plate, a gauze shelf, and a bottom plate shelf, the gauze shelf and the bottom plate shelf being attached to the carrier plate; and,
   the carrier plate being attached to the top flange by means of the rounded inner edge (113).
2. The rim according to claim 1 wherein the carrier plate has a thickness which is constant within a margin of error of 10%.
3. The rim according to claim 2 wherein the margin of error is 5%.
4. The rim according to claim 1 wherein the carrier plate is planar.
5. The rim according to claim 1 wherein the ratio of the width of the planar section and the radius of curvature of the rounded outer edge is between 0.50 to 10.0.
6. The rim according to claim 1 wherein the radius of curvature of the rounded outer edge equals the radius of curvature of the rounded inner edge within a margin of error of 10.0%.
7. The rim according to claim 6 wherein the margin of error is 5%.
8. The rim according to claim 1 wherein the planar section has a width of 2.0 cm to 20.0 cm.
9. The rim according to claim 8 wherein the width of the planar section is 2.0 cm to 10.0 cm.

10. The rim according to claim 1 wherein at least one of the rounded outer edge and the rounded inner edge have a radius of curvature of at least 20 mm to at most 100 mm.

11. The rim according to claim 10 wherein the radius of curvature is from 25 mm to at most 50 mm.

12. The rim according to claim 1 wherein at least one of the gauze shelf and the bottom plate shelf comprise a plurality of expansion slits.

13. The rim according to claim 12 wherein the expansion slits end in a hole.

14. The rim according to claim 1 further comprising a wave breaker ring attached to the carrier plate between the bottom plate shelf and the gauze shelf.

15. The rim according to claim 14 wherein the distance between the bottom plate shelf and the wave breaker ring is between 130 mm and 150 mm.

16. A catalyst support system for ammonia oxidation burners comprising a rim according to claim 1, and a body comprising at least one catalyst gauze, and a bottom plate.

17. An ammonia burner comprising a reactor vessel and a catalyst support system according to claim 16, the reactor vessel comprising a reactor wall, the catalyst support system being attached to the reactor wall.

18. The ammonia burner according to claim 17, further comprising a heat shield between the catalyst support system and the reactor wall.

19. The ammonia burner according to claim 18 wherein at least one wall coil is attached to the reactor wall, the heat shield being between the at least one wall coil and the catalyst support system.

20. The ammonia burner according to claim 17, further comprising at least one counter weight for holding down the at least one catalyst gauze.

21. The ammonia burner according to claim 20 further comprising at least one heat shield that is located on top of the at least one counter weight.

22. The ammonia burner according to claim 17 wherein the catalyst support system is attached to the reactor wall by means of at least one weld.

23. A method for oxidizing ammonia comprising the steps:
   providing an ammonia burner according to claim 17;
   directing an air-ammonia mixture over the at least one catalyst gauze; and,
   catalytically oxidizing the ammonia.

* * * * *